United States Patent
Fansler et al.

(10) Patent No.: US 6,784,265 B2
(45) Date of Patent: Aug. 31, 2004

(54) RING-OPENED AZLACTONE INITIATORS FOR NITROXIDE-MEDIATED POLYMERIZATION

(75) Inventors: Duane D. Fansler, Dresser, WI (US); Kevin M. Lewandowski, Inver Grove Heights, MN (US); Michael S. Wendland, North Saint Paul, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/726,956

(22) Filed: Dec. 3, 2003

(65) Prior Publication Data

US 2004/0152853 A1 Aug. 5, 2004

Related U.S. Application Data

(62) Division of application No. 10/358,767, filed on Feb. 5, 2003, now Pat. No. 6,680,362.

(51) Int. Cl.$^7$ .................................................. C08F 2/00
(52) U.S. Cl. ...................... 526/220; 526/217; 526/222; 526/265; 526/271; 526/287; 526/291; 526/303.1; 526/304; 526/306; 526/317.1; 526/318.2; 526/319; 526/335; 526/347
(58) Field of Search ................................ 526/217, 220, 526/222, 265, 271, 287, 291, 303.1, 304, 306, 317.1, 318.2, 319, 335, 347

(56) References Cited

U.S. PATENT DOCUMENTS

| | | | | |
|---|---|---|---|---|
| 5,506,279 A | * | 4/1996 | Babu et al. | 522/34 |
| 5,527,921 A | * | 6/1996 | Haubrich | 548/334.5 |
| 6,448,337 B1 | * | 9/2002 | Gaddam et al. | 525/193 |

* cited by examiner

*Primary Examiner*—Helen L. Pezzuto
(74) *Attorney, Agent, or Firm*—Kent S. Kokko

(57) ABSTRACT

Initiators for nitroxide-mediated radical polymerizations are described. The initiators have an azlactone or ring-opened azlactone moiety to provide telechelic (co)polymers.

25 Claims, No Drawings

RING-OPENED AZLACTONE INITIATORS FOR NITROXIDE-MEDIATED POLYMERIZATION

This application is a divisional of U.S. Ser. No. 10/358,767, filed Feb. 5, 2003, now U.S. Pat. No. 6,680,362 B1, the disclosure of which is herein incorporated by reference.

FIELD OF THE INVENTION

The present invention provides initiators for nitroxide-mediated radical polymerization (NMP) processes.

BACKGROUND

In conventional radical polymerization processes, the polymerization terminates when reactive intermediates are destroyed or rendered inactive; radical generation is essentially irreversible. It is often difficult to control the molecular weight and the polydispersity (molecular weight distribution) of polymers produced by conventional radical polymerization, in order to achieve a highly uniform and well-defined product. It is also often difficult to control radical polymerization processes with the degree of certainty necessary in specialized applications, such as in the preparation of end functional polymers, block copolymers, star (co)polymers, and other novel topologies.

In a controlled radical polymerization process radicals are generated reversibly, and irreversible chain transfer and chain termination are absent. There are four major controlled radical polymerization methodologies: atom transfer radical polymerization (ATRP), reversible addition-fragmentation chain transfer (RAFT), nitroxide-mediated polymerization (NMP) and iniferters, each method having advantages and disadvantages.

Nitroxide mediated radical polymerization (NMP) has been described as a simple, versatile and efficient controlled radical polymerization process. See, e.g., C. J. Hawker et al., "New Polymer Synthesis by Nitroxide Mediated Living Radical Polymerizations", *Chemical Reviews*, 2001, pp. 3661–3688. NMP processes employ an alkoxy amine as an initiator to produce a polymeric radical in the presence of a monomer.

There is a need for a radical polymerization process which provides telechelic (co)polymers having a predictable molecular weight and a narrow molecular weight distribution (low "polydispersity"). A further need is for a radical polymerization process which is sufficiently flexible to provide a wide variety of products, but which can be controlled to the degree necessary to provide highly uniform products with a controlled structure (i.e., controllable topology, composition, etc.). There is further need for a controlled radical polymerization process which provides telechelic (co)polymers capable of entering into further polymerization or functionalization through reactive end-groups, particularly electrophilic end groups.

SUMMARY OF THE INVENTION

In one aspect, the present invention provides initiators for nitroxide-mediated radical polymerization processes that comprise compounds of the Formula I:

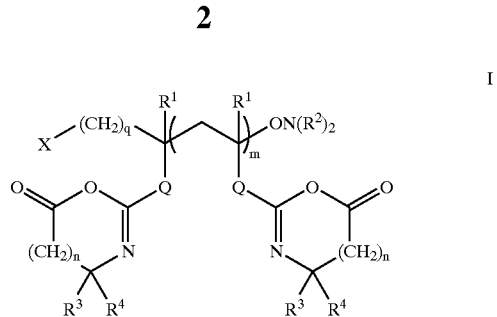

wherein X is H, an alkyl group, a cycloalkyl group, a heterocyclic group, an arenyl group, an aryl group, a cyano group, an acyl group or the residue of a free-radical initiator;

$R^1$ is H, an alkyl group, a cycloalkyl group, a heterocyclic group, an arenyl group or an aryl group;

$ON(R^2)_2$ is the residue of an organonitroxide;

$R^3$ and $R^4$ are independently selected from an alkyl, a cycloalkyl group, an aryl group, an arenyl group, or $R^3$ and $R^4$ taken together with the carbon to which they are attached form a carbocyclic ring;

Q is a linking group selected from a covalent bond, $(—CH_2—)_o$, $—CO—O—(CH_2)_o—$, $—CO—O—(CH_2CH_2O)_o—$, $—CO—NR^6—(CH_2)_o—$, $—CO—S—(CH_2)_o—$, where o is 1 to 12, and $R^6$ is H, an alkyl group, a cycloalkyl group, an arenyl group, a heterocyclic group or an aryl group;

each n is 0 or 1;

q is 0 or 1; and m is 0 to 20.

The present invention also provides initiators that comprise the ring-opened reaction product of the initiators of Formula I and a reactive compound, such as an aliphatic compound, having one or more nucleophilic groups. Such initiators have the general Formula II:

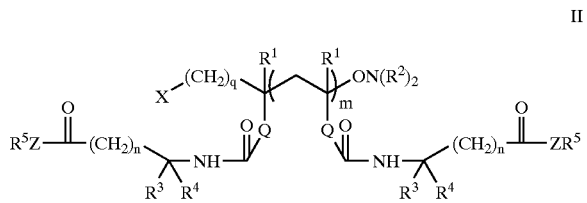

wherein

X is an H, an alkyl group, a cycloalkyl group, a heterocyclic group, an arenyl group, an aryl group, a nitrile, an acyl group or the residue of a free-radical initiator;

$R^1$ is H, an alkyl group, a cycloalkyl group, a heterocyclic group, an arenyl group or an aryl group;

$ON(R^2)_2$ is the residue of an organonitroxide;

$R^3$ and $R^4$ are each independently selected from an alkyl, a cycloalkyl group, an aryl group, an arenyl group, or $R^3$ and $R^4$ taken together with the carbon to which they are attached form a carbocyclic ring;

Q is a linking group selected from a covalent bond, $(—CH_2—)_o$, $—CO—O—(CH_2)_o—$, $—CO—O—$, $—(CH_2CH_2O)_o—$, $—CO—NR^6—(CH_2)_o—$, $—CO—S—(CH_2)_o—$, where o is 1 to 12, and $R^6$ is H, an alkyl group, a cycloalkyl group, an arenyl group, a heterocyclic group or an aryl group;

each n is 0 or 1;

q is 0 or 1;

m is 0 to 20;

Z is O, S or $NR^6$, wherein $R^6$ is H, an alkyl group, a cycloalkyl group, an arenyl group, a heterocyclic group or an aryl group;

$R^5$ is an organic or inorganic moiety and has a valency of p, $R^5$ is the residue of a mono- or polyfunctional compound of the formula $R^5(ZH)_p$.

The initiators of the present invention provide (co) polymers having a predictable molecular weight and a narrow molecular weight distribution. Advantageously, the initiators provide novel multireactive addition polymers having first and second terminal reactive groups that may be used for further functionalization. The present invention further provides a controlled radical polymerization process useful in the preparation of terminal-functionalized (telechelic) (co)polymers, block copolymers, star (co) polymers, graft copolymers, and comb copolymers. The process provides these (co)polymers with controlled topologies and compositions.

The control over molecular weight and functionality obtained in this invention allows one to synthesize numerous materials with many novel topologies for applications in coatings, surface modifications, elastomers, sealants, lubricants, pigments, personal care compositions, composites, inks, adhesives, water treatment materials, hydrogels, imaging materials, telechelic materials and the like.

In another aspect, the invention provides a method for polymerization of one or more olefinically unsaturated monomers comprising addition polymerizing one or more olefinically unsaturated monomers using the azlactone initiators of Formula I, or the ring-opened azlactone initiators of Formula II.

It is to be understood that the recitation of numerical ranges by endpoints includes all numbers and fractions subsumed within that range (e.g. 1 to 5 includes 1, 1.5, 2, 2.75, 3, 3.80, 4, and 5).

It is to be understood that all numbers and fractions thereof are presumed to be modified by the term "about."

It is to be understood that "a" as used herein includes both the singular and plural.

The general definitions used herein have the following meanings within the scope of the present invention.

The term "alkyl" refers to straight or branched, cyclic or acyclic hydrocarbon radicals, such as methyl, ethyl, propyl, butyl, octyl, isopropyl, tert-butyl, sec-pentyl, cyclohexyl, and the like. Alkyl groups include, for example, 1 to 18 carbon atoms, preferably 1 to 12 carbon atoms, or most preferably 1 to 6 carbon atoms.

The term "aryl" means the monovalent residue remaining after removal of one hydrogen atom from an aromatic compound which can consist of one ring or two fused rings having 6 to 12 carbon atoms.

The term "arenyl" means the monovalent residue remaining after removal of a hydrogen atom from the alkyl portion of a hydrocarbon containing both alkyl and aryl groups having 6 to 26 atoms.

The term "azlactone" means 2-oxazolin-5-one groups and 2-oxazolin-6-one groups of Formula I, where n is 0 and 1, respectively.

The term "heterocyclic group" or "heterocycle" means the monovalent residue remaining after removal of one hydrogen atom from an cycloaliphatic or aromatic compound having one ring or two fused rings having 5 to 12 ring atoms and 1 to 3 heteroatoms selected from S, N, and nonperoxidic O. Useful heterocycles include aziactonyl, pyrrolyl, furan, thiophenyl, imidazolyl, pyrazolyl, thiazolyl, oxazolyl, pyridinyl, piperazinyl, piperidinyl, hydrogenated and partially hydrogenated derivatives thereof.

The term "multifunctional" means the presence of more than one of the same functional reactive group;

The term "multireactive" means the presence of two or more of two different functional reactive groups;

The term "polyfunctional" is inclusive of multireactive and multifunctional.

The term "molecular weight" means number average molecular weight ($M_n$), unless otherwise specified.

The term (co)polymer refers to homo- and copolymers.

The term (meth)acrylate refers to both methacrylate and acrylate.

DETAILED DESCRIPTION

The present invention provides novel initiators of Formula I and the corresponding ring-opened initiators of Formula II for controlled radical polymerization processes.

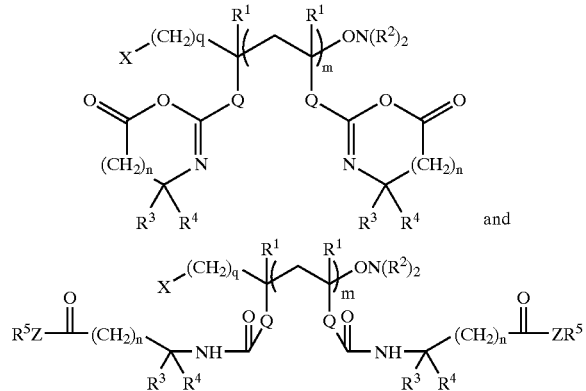

wherein

X is an H, an alkyl group, a cycloalkyl group, a heterocyclic group, an arenyl group, an aryl group, a nitrile, an acyl group or the residue of a free-radical initiator;

$R^1$ is H, an alkyl group, a cycloalkyl group, a heterocyclic group, an arenyl group or an aryl group;

$ON(R^2)_2$ is the residue of an organonitroxide;

$R^3$ and $R^4$ are each independently selected from an alkyl, a cycloalkyl group, an aryl group, an arenyl group, or $R^3$ and $R^4$ taken together with the carbon to which they are attached form a carbocyclic ring;

Q is a linking group selected from a covalent bond, $(-CH_2-)_o$, $-CO-O-(CH_2)_o-$, $-CO-O-$, $-(CH_2CH_2O)_o-$, $-CO-NR^6-(CH_2)_o-$, $-CO-S-(CH_2)_o-$, where o is 1 to 12, and $R^6$ is H, an alkyl group, a cycloalkyl group, an arenyl group, a heterocyclic group or an aryl group;

each n is 0 or 1;

q is 0 or 1;

m is 0 to 20;

Z is O, S or $NR^6$, wherein $R^6$ is H, an alkyl group, a cycloalkyl group, an arenyl group, a heterocyclic group or an aryl group;

$R^5$ is an organic or inorganic moiety and has a valency of p, $R^5$ is the residue of a mono- or polyfunctional compound of the formula $R^5(ZH)_p$.

The organonitroxide moiety, $-ON(R^2)_2$, may comprise the residue of any hindered organonitroxide which, on exposure to thermal energy, homolytically cleaves at the C—O bond to form a radical. The hindered organonitroxide moieties are of the general formula:

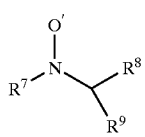

wherein
- $R^7$ is an alkyl group, a cycloalkyl group, an arenyl group, a heterocyclic group, an aryl group,
- $R^8$, and $R^9$ are independently H, or an alkyl group, a cycloalkyl group, an arenyl group, a heterocyclic group, an aryl group,
- $R^7$ and $R^8$, or $R^8$ and $R^9$, may be taken together to form a carbocyclic ring structure. Each of $R^7$, $R^8$, or $R^9$ may be substituted by an alkoxy group, an aryloxy group, a silyl group, a boryl group, a phosphino group, an amino group, a thio group a seleno group, and combinations thereof. Reference may be made to U.S. Pat. No. 6,472,486, incorporated herein by reference.

Useful organonitroxides include:

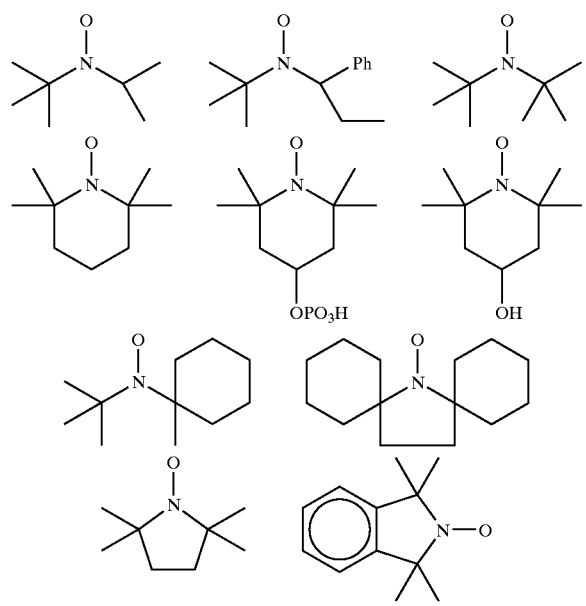

Initiators of Formula I may be prepared using the generalized schemes as shown, where "Az" refers to the pendent azlactone moiety of Formula I and where structural details have been eliminated for clarity.

Scheme I

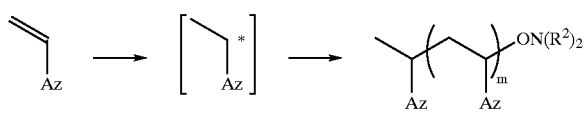

Scheme II

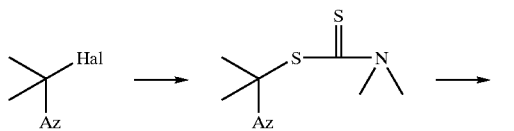

-continued

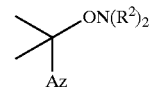

In Scheme I, a vinyl azlactone is first treated with a free-radical initiator to form the transient azlactone radical shown. This radical may be captured by an organonitroxide of the formula $ON(R^2)_2$ (previously described), or may oligomerize with additional vinyl azlactone to produce an oligomeric radical having a plurality of pendant azlactone groups. This oligomeric radical may then be captured by the organonitroxide to form an oligomeric initiator of Formula I, where (with reference to Formula I) X is the residue of a free radical initiator, m is 1 to 20, and q for the $(CH_2)_q$ adjacent to the X group is 1. The degree of oligomerization depends on the substitution of the olefinic bond. With reference to formula I, those compounds where $R^1$ is H oligomerize readily, however where $R^1$ is an alkyl group, the compounds oligomerize less readily. As in any conventional oligomerization process, the products will comprise a range of molecular weights and degrees of oligomerization. Thus the value m may be a non-integral value, reflecting the average degree of oligomerization of the product.

Any conventional free radical initiator, including photo- and thermal initiators may be used to generate the initial azlactone radical. The degree of oligomerization can be controlled by the amount of initiator, the temperature and concentration. In one embodiment, the initiator is a photoinitiator and is capable of being activated by UV radiation, e.g., at wavelengths from about 250 nm to about 450 nm, more preferably at about 351 nm. Useful photoinitiators include e.g., benzoin ethers such as benzoin methyl ether and benzoin isopropyl ether, substituted benzoin ethers, substituted acetophenones such as 2,2-dimethoxy-2-phenylacetophenone, and substituted alpha-ketols. Examples of commercially available photoinitiators include Irgacure™ 819 and Darocur™ 1173 (both available form Ciba-Geigy Corp., Hawthorne, N.Y.), Lucern TPO™ (available from BASF, Parsippany, N.J.) and Irgacure™ 651, (2,2-dimethoxy-1,2-diphenyl-1-ethanone) which is available from Ciba-Geigy corporation and is.

Examples of suitable thermal initiators include peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, Del.) under the VAZO trade designation including VAZO™ 64 (2,2'-azo-bis(isobutyronitrile)) and VAZO™ 52, and Lucidol™ 70 from Elf Atochem North America, Philadelphia, Pa.

The initiator is used in an amount effective to facilitate oligomerization of the vinyl azlactone and the amount will vary depending upon, e.g., the type of initiator, and the molecular weight of the vinyl azlactone. The initiators can be used in amounts from about 0.001 part by weight to about 1 parts by weight based on 100 parts vinyl azlactone.

In Scheme II, a halogen-substituted azlactone is treated with a dithiocarbamate salt to displace the halide (Hal) to form the depicted dithiocarbamate-substituted azlactone.

This may be treated with light energy in the presence of an organonitroxide to generate the transient azlactone radical, which is captured by the organonitroxide to produce a monomeric initiator where, with reference to Formula I, q is 0, and X is an H, an alkyl group, a cycloalkyl group, a heterocyclic group, an arenyl group, an aryl group, a nitrile, or an acyl group. Further details regarding the preparation of azlactones may be found in "Polyazlactones", *Encyclopedia of Polymer Science and Engineering*, vol. 11, 2$^{nd}$ Ed., John Wiley and Sons, pp. 558–571 (1988). Alternatively, the depicted halide compound may be converted to the indicated organonitroxide by ATRP methods.

Useful azlactone initiators include the following compounds:

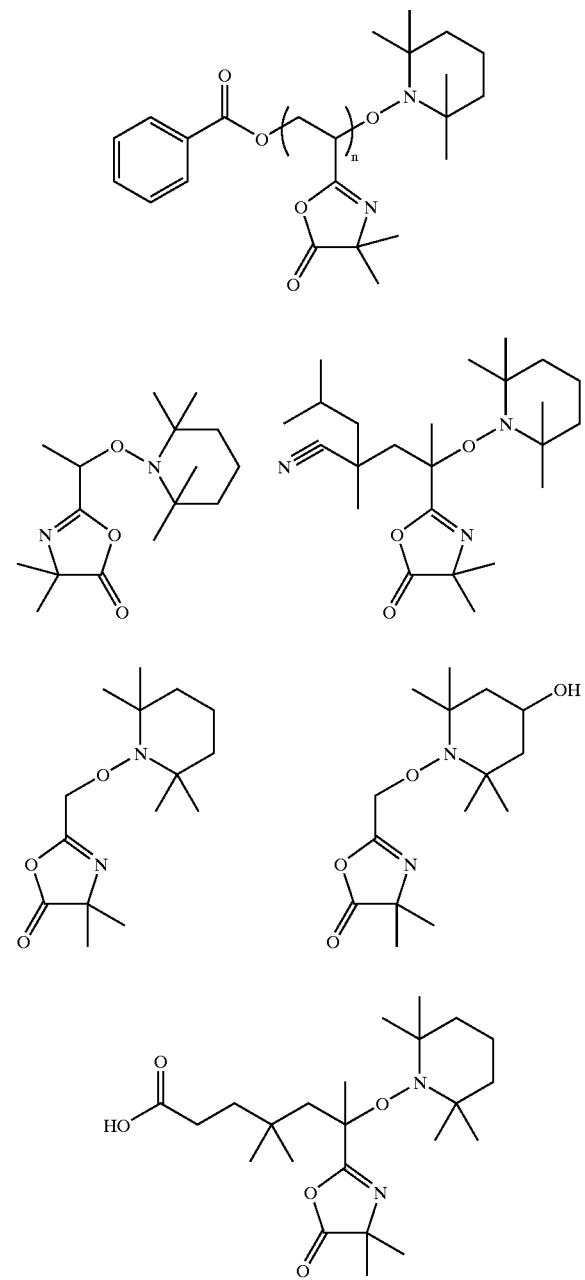

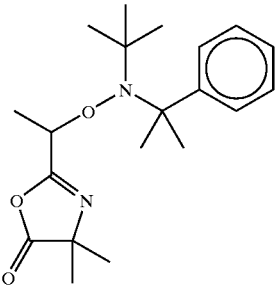

Ring-opened azlactone compounds of Formula II may be made by nucleophilic addition of a compound of the formula $R^5(ZH)_p$ to the azlactone carbonyl of Formula I as shown below. In the Scheme III below, $R^5$ is an inorganic or organic group of valence p, having one or a plurality of nucleophilic —ZH groups that are capable of reacting with the azlactone moiety of Formula I. $R^5(ZH)_p$ may be water. $R^1$, $R^3$ to $R^5$, $ON(R^2)_2$, X, Q, Z, n, q and p are as defined in Formulas I and II. For simplicity, the repeat unit of the oligomerized initiators is not shown.

Scheme III

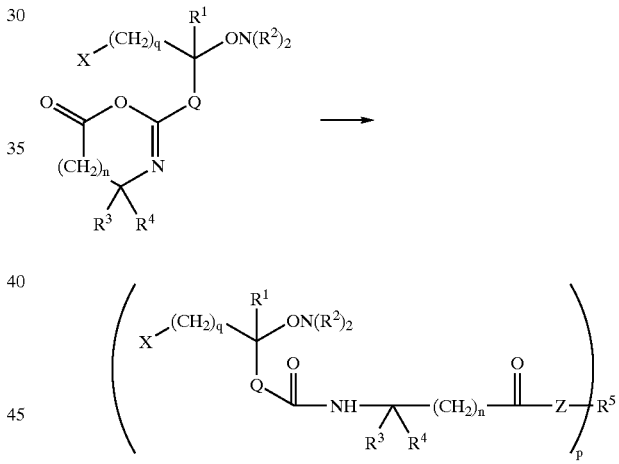

If organic, $R^5$ may be a polymeric or non-polymeric organic group that has a valence of p and is the residue of a nucleophilic group-substituted compound, $R^5(ZH)_p$, in which Z is —O—, —S—, or —NR$^6$ wherein $R^6$ can be a H, an alkyl, a cycloalkyl or aryl, a heterocyclic group, an arenyl and p is at least one, preferably at least 2. The organic moiety $R^5$ has a molecular weight up to 20,000, preferably selected from mono- and polyvalent hydrocarbyl (i.e., aliphatic and aryl compounds having 1 to 30 carbon atoms and optionally zero to four catenary heteroatoms of oxygen, nitrogen or sulfur), polyolefin, polyoxyalkylene, polyester, polyolefin, polyacrylate, or polysiloxane backbones. If inorganic, $R^5$ may comprise metal- or nonmetal oxides such as silica, alumina or glass having one or a plurality of —ZH groups on the surface.

In one embodiment, $R^5$ comprises a non-polymeric aliphatic, cycloaliphatic, aromatic or alkyl-substituted aromatic moiety having from 1 to 30 carbon atoms. In another embodiment, $R^5$ comprises a polyoxyalkylene, polyester, polyolefin, polyacrylate, or polysiloxane polymer having pendent or terminal reactive —ZH groups. Useful polymers include, for example, hydroxyl, thiol or amino terminated polyethylenes or polypropylenes, hydroxyl, thiol or amino terminated poly(alkylene oxides) and polyacylates having pendant reactive functional groups, such as hydroxyethyl acrylate polymers and copolymers.

Depending on the nature of the functional group(s) of $R^5(ZH)_p$, a catalyst may be added to effect the condensation reaction. Normally, primary amine groups do not require catalysts to achieve an effective rate of condensation with the azlactone group of Formula I. Acid catalysts such as trifluoroacetic, ethanesulfonic, and toluenesulfonic acids are effective catalysts with hydroxyl groups and secondary amines.

With respect to the compound $R^5(ZH)_p$, p is at least one, but preferably p is at least two. The multiple —ZH groups of the polyfunctional compound may be the same or different. Multifunctional compounds may be reacted with the azlactone compound of Formula I to produce polyfunctional initiators of Formula II, where p is at least two. Such polyfunctional initiators allow the preparation of graft, and star (co)polymers and other useful topologies.

Useful alcohols of the formula $R^5(ZH)_p$ include aliphatic and aromatic monoalcohols and polyols. Useful monoalcohols include methanol, ethanol, octanol, decanol, and phenol. The polyols useful in the present invention include aliphatic or aromatic polyols having 1 to 30 carbon atoms, at least two hydroxyl groups. Example of useful polyols include ethylene glycol, propylene glycol, butanediol, 1,3-pentanediol, 2,2-oxydiethanol, hexanediol, poly(pentyleneadipate glycol), poly(tetramethylene ether glycol), poly(ethylene glycol), poly(caprolactone diol), poly(1,2-butylene oxide glycol), trimethylol ethane, trimethylol propane, trimethylol aminomethane, ethylene glycol, 2-butene-1,4-diol, pentaerythritol, dipentaerythritol, and tripentaerythritol. The term "polyol" also includes derivatives of the above-described polyols such as the reaction product of the polyol with di- or poly-isocyanate, or di- or poly-carboxylic acid, the molar ratio of polyol to —NCO, or —COOH being 1 to 1.

Useful amines of the formula $R^5(ZH)_p$ include aliphatic and aromatic monoamines and polyamines. Any primary or secondary amine may be employed, although primary amines are preferred to secondary amines. Useful monoamines include, for example, methyl-ethyl-, propyl-, hexyl-, octyl, dodecyl-, dimethyl-, and aniline. The term "di-, or polyamine," refers to organic compounds containing at least two non-tertiary amine groups. Aliphatic, aromatic, cycloaliphatic, and oligomeric di- and polyamines all are considered useful in the practice of the invention. Representative of the classes of useful di- or polyamines are 4,4'-methylene dianiline, 3,9-bis(3-aminopropyl)-2,4,8,10-tetraoxaspiro[5,5]undecane, and polyoxyethylenediamine. Many di- and polyamines, such as those just named, are available commercially, for example, those available from Huntsman Chemical, Houston, Tex. Preferred di- or polyamines include aliphatic diamines or aliphatic di- or polyamines and more specifically compounds with two primary amino groups, such as ethylene diamine, hexamethylene diamine, dodecanediamine, and the like.

Useful thiols of the formula $R^5(ZH)_p$ include aliphatic and aromatic monothiols and polythiols. Useful alkyl thiols include methyl, ethyl, and butyl thiol, as well as 2-mercaptoethanol, 3-mercapto-1,2-popanediol, 4-mercaptobutanol, mercaptoundecanol, 2-mercaptoethylamine, 2,3-dimercaptopropanol, 3-mercaptopropyltrimethoxysilane, 2-chloroethanethiol, 2-amino-3-mercaptopropionic acid, dodecyl mercaptan, thiophenol, 2-mercaptoethyl ether, and pentaerythritol tetrathioglycolate. Useful soluble, high molecular weight thiols include polyethylene glycol di(2-mercaptoacetate), LP-3™ resins supplied by Morton Thiokol Inc. (Trenton, N.J.), and Permapol P3™ resins supplied by Products Research & Chemical Corp. (Glendale, Calif.) and compounds such as the adduct of 2-mercaptoethylamine and caprolactam.

The invention provides multifunctional initiators as shown in Scheme III, whereby an azlactone initiator of Formula I is ring-opened by a multireactive or multifunctional compound of the formula $R^5(ZH)_p$, where p is at least 2. Such multifunctional initiators may be used to produce branched, star and graft (co)polymers and other topologies. It will also be apparent that such (co)polymers may also be prepared by first polymerizing a monomer using the initiator of Formula I, to produce polymers having an azlactone group at one terminal end, and then subsequently reacting the polymers with a polyfunctional compound of the formula $R^5(ZH)_p$, where p is at least 2.

Although the repeat unit of the oligomeric initiators is not shown in Scheme III, it will be appreciated that the —ZH groups of a multifunctional compound $R^5(ZH)_p$ may react with the multiple, pendent azlactone groups on the same oligomer, or the azlactone groups on different oligomers to form a crosslinked composition. Additionally it will be appreciated that the multiple $R^5$ groups depicted in Formula II may be the same $R^5$ group whose multiple ZH groups react with adjacent azlactone groups on the same oligomer.

In another embodiment, the multifunctional initiators may comprise a solid support having a plurality of initiator moieties on the surface thereof. Such initiator-functionalized supports have the general structure (corresponding to Formula II):

IV

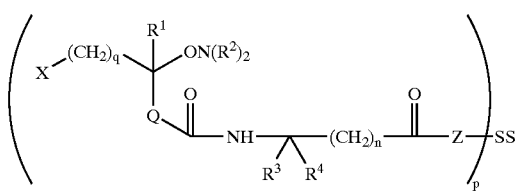

wherein X, $R^1$, $ON(R^2)_2$, $R^3$, $R^4$, X, Z, q, p and n are as previously described for Formula II and SS is a solid support corresponding to $R^5$. For clarity, the repeat unit of the oligomeric initiator is not shown in Formula IV. The solid support material includes functional groups to which initiator molecules of Formula I can be covalently attached for effecting polymerization on the solid surface. Useful functional groups include hydroxyl, amino and thiol functional groups corresponding to —ZH.

The solid support material (SS) can be organic or inorganic. It can be in the form of a solid, gel, glass, etc. It can be in the form of a plurality of particles (e.g., beads, pellets, or microspheres), fibers, a membrane (e.g., sheet or film), a disc, a ring, a tube, or a rod, for example. Preferably, it is in the form of a plurality of particles or a membrane. It can be swellable or non-swellable and porous or nonporous.

The support material (SS) can be a polymeric material that can be used in conventional solid phase synthesis. It is chosen such that it is generally insoluble in the solvents or other components used in synthetic reactions that occur during the course of solid phase synthesis. Examples of useable preexisting support materials are described in G. B. Fields et al., *Int. J. Peptide Protein Res.*, 35, 161 (1990) and G. B. Fields et al., in *Synthetic Peptides*: A User's Guide, G. A. Grant, Ed., pages 77–183, W. H. Freeman and Co., New York, N.Y. (1992). The support material is in the form of an organic polymeric material, such as polystyrenes, polyalkylenes, nylons, polysulfones, polyacrylates, polycarbonates, polyesters, polyimides, polyurethanes, etc. and having hydroxyl, amino or thiol substituents on the surface. For pre-existing support materials, a preferred support material is polystyrene.

The initiators may be used for controlled radical polymerization of ethylenically unsaturated monomers. Examples of ethylenically unsaturated monomers that may be polymerized include (meth)acrylates such as ethyl (meth)acrylate, propyl (meth)acrylate, butyl (meth)acrylate, isooctyl (meth)acrylate and other alkyl (meth)acrylates; also functionalized (meth)acrylates including glycidyl (meth)acrylate, trimethoxysilyl propyl (meth)acrylate, allyl (meth)acrylate, hydroxyethyl (meth)acrylate, hydroxypropyl (meth)acrylate, dialkylaminoalkyl (meth)acrylates; fluoroalkyl (meth)acrylates; (meth)acrylic acid, fumaric acid (and esters), itaconic acid (and esters), maleic anhydride; styrene, α-methyl styrene; vinyl halides such as vinyl chloride and vinyl fluoride; (meth)acrylonitrile; vinylidene halides; unsaturated alkylsulphonic acids or derivatives thereof; 2-vinyl-4,4-dimethylazlactone, and (meth)acrylamide or derivatives thereof. Mixtures of such monomers may be used.

In the present polymerization, the amounts and relative proportions of initiator is that effective to conduct nitroxide-mediated radical polymerization (NMP). The concentration and amounts is generally determined by the desired molecular weight of the resulting polymer. Accordingly, the amount of initiator can be selected such that the initiator concentration is from $10^{-4}$ M to 1M, preferably $10^{-3}$ to $10^{-1}$ M. Alternatively, the initiator can be present in a molar ratio of from $10^{-4}$:1 to $10^{-1}$:1, preferably from $10^{-3}$:1 to $5\times10^{-2}$:1, relative to monomer.

The present polymerization may be conducted in bulk or in a solvent. Solvents, preferably organic, can be used to assist in the dissolution of the initiator and the polymerizable monomers, and as a processing aid. Preferably, such solvents are not reactive with the azlactone group. It may be advantageous to prepare a concentrated solution of the initiator in a small amount of solvent to simplify the preparation of the polymerizable composition.

Suitable solvents include ethers such as diethyl ether, ethyl propyl ether, dipropyl ether, methyl t-butyl ether, di-t-butyl ether, glyme (dimethoxyethane), diethylene glycol dimethyl ether; cyclic ethers such as tetrahydrofuran and dioxane; alkanes; cycloalkanes; aromatic hydrocarbon solvents such as benzene, toluene, o-xylene, m-xylene, p-xylene; halogenated hydrocarbon solvents; acetonitrile; lactones such as butyrolactone, and valerolactones; ketones such as acetone, methyl ethyl ketone, methyl isobutyl ketone, cyclopentanone, and cyclohexanone; sulfones such as tetramethylene sulfone, 3-methylsulfolane, 2,4-dimethylsulfolane, butadiene sulfone, methyl sulfone, ethyl sulfone, propyl sulfone, butyl sulfone, methyl vinyl sulfone, 2-(methylsulfonyl) ethanol, and 2,2'-sulfonyldiethanol; amides such as dimethyl formamide; sulfoxides such as dimethyl sulfoxide; cyclic carbonates such as propylene carbonate, ethylene carbonate and vinylene carbonate; carboxylic acid esters such as ethyl acetate, Methyl Cellosolve™ and methyl formate; and other solvents such as methylene chloride, nitromethane, acetonitrile, and glycol sulfite, mixtures of such solvents, and supercritical solvents (such as $CO_2$). The present polymerization may also be conducted in accordance with known suspension, emulsion and precipitation polymerization processes.

The polymerization reaction may be controlled by matching the reactivity of the nitroxide groups in the initiator with the monomer, and by matching the energetics of bond breaking and bond forming in dormant species, e.g., dormant polymer chains and transition metal species. Matching the reactivities of the initiator with the monomer depends to some degree on the radical stabilizing effects of the substituents. Such matching of substituents on the initiator and monomer typically provides a beneficial balance of the relative reactivities of the initiator and monomer.

Polymerizing may be conducted at a temperature of from 20 to 200° C., preferably from 100 to 160° C. and most preferably from 100 to 140° C., although the temperature is dependent on the reactivity of the specific organonitroxide used. The reaction should be conducted for a length of time sufficient to convert at least 10% (preferably at least 50%, more preferably at least 75% and most preferably at least 90%) of the monomer to polymer. Typically, the reaction time will be from several minutes to 5 days, preferably from 30 minutes to 3 days, and most preferably from 1 to 24 hours.

Polymerizing may be conducted at a pressure of from 0.1 to 100 atmospheres, preferably from 1 to 50 atmospheres and most preferably at ambient pressure (although the pressure may not be measurable directly if conducted in a sealed vessel). An inert gas such as nitrogen or argon may be used.

If desired, a "one-pot" synthesis may be used whereby the azlactone initiator is prepared according either Scheme I or II, and then the monomer(s) is added. Typically, the initiator is generated at a first temperature that is lower than that required to effect polymerization of the monomer(s), then the temperature is raised. Thus, the initiator is prepared at a temperature ranging from 20 to 100° C., the monomer(s) added, and the temperature raised to 100 to 200° C. Further, the initiator may also be prepared in the presence of monomer(s) at a first temperature that is sufficient to effect the preparation of the initiator, but too low to effect polymerization of the monomer(s), and then the temperature is raised to effect polymerization of the monomer(s).

If desired, a conventional free-radical initiator may be added as an accelerant to the polymerizable mixture.

The (co)polymers obtained by the method of the invention may be described as telechelic (co)polymers comprising polymerized units of one or more free radically (co)polymerizable monomers (as previously described), a first terminal group selected from the group derived from $ON(R^2)_2$ and a second azlactone terminal group derived from the initiator of Formulas I or II:

Such (co)polymers have the general formula

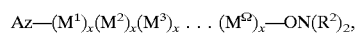

wherein "—$ON(R^2)_2$ is derived from the organonitroxide moiety, $M^1$ to $M^\Omega$ are each polymerized monomer units derived from a radically (co)polymerizable monomer unit having an average degree of polymerization x, each x is independent, and Az is an azlactone group or a ring-opened azlactone group.

The polymer product retains the functional group "ON$(R^2)_2$" at a first terminal end of the polymer to initiate a further polymerization or may be used for further functionalization. The polymer product further comprises either the azlactone moiety or the ring-opened azlactone moiety of the initiator at a second terminal end, which may be further reacted or functionalized as desired. Because the two terminal moieties have different functionality and reactivity, each terminus may be independently functionalized.

Where an initiator of Formula I is used, the second terminal group "Az" will comprise the residue of the azlactone group of the formula:

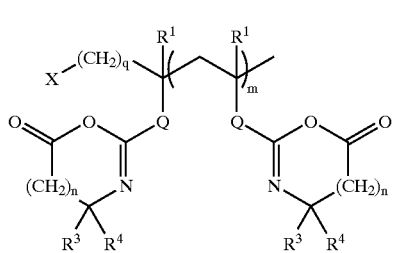

V where $R^1$, $R^3$, $R^4$, Q, X, n, q and m are as previously defined for Formula I.

Alternatively, when using the initiators of Formula II, the second terminal group "Az" will comprise the ring-opened residue of the azlactone group:

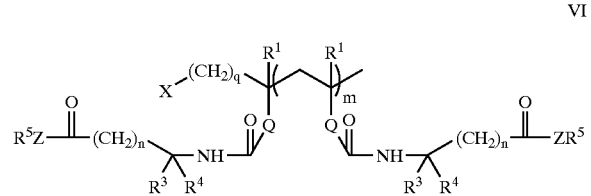

VI where $R^1$, $R^3$, $R^4$, $R^5$, Z, Q, X, n, q and m are as previously defined for Formula II. Again, the $R^5$ groups depicted for Formula VI may be derived from the same molecule or different molecules of $R^5(ZH)_p$.

The terminal "—ON$(R^2)_2$" group may be functionalized independently from the terminal "Az" group. For example, where $R^2$ contains a reactive group such as a hydroxyl group, the reactive group may be reacted with an electrophile such as a carboxylic acid, carboxylic anhydride, or carboxylic acid chloride to produce a carboxylic ester. Additional methods of converting an alkoxyamine group to other functional groups are known in the art, and reference may be made to *Macromol.*, vol. 34, pp 3856–3862, 2001.

The present invention encompasses a novel process for preparing random, block, multi-block, star, gradient, random hyperbranched and dendritic copolymers, as well as graft or "comb" copolymers. Each of these different types of copolymers will be described hereunder.

Since NMP is a "living" or "controlled" polymerization, it may be initiated and terminated as desired. Thus, in one embodiment, once the first monomer is consumed in the initial polymerizing step, a second monomer may then be added to form a second block on the growing polymer chain in a second polymerizing step. Additional polymerizations with the same or different monomer(s) may be performed to prepare multi-block copolymers. The subsequent polymer steps may use the same initiator system as in the first step of the polymerization, or another may be chosen to reflect or "match" the different reactivity of the subsequent monomers.

Because NMP is radical polymerization, blocks may be prepared in essentially any order. One is not necessarily limited to preparing block copolymers where the sequential polymerizing steps must flow from the least stabilized polymer intermediate to the most stabilized polymer intermediate, such as is necessary in ionic polymerization. Thus, one may prepare a multi-block copolymer in which a polyacrylonitrile or a poly(meth)acrylate block is prepared first, then a styrene or butadiene block is attached thereto, etc.

Furthermore, a linking group is not necessary to join the different blocks of the present block copolymer. One may simply add successive monomers to form successive blocks. Further, it is also possible (and in some cases advantageous) to first isolate a (co)polymer produced by the present NMP process, then react the polymer with an additional monomer using a different initiator/catalyst system (to "match" the reactivity of the growing polymer chain with the new monomer). In such a case, the product polymer having a terminal "ON$(R^2)_2$" group acts as the new initiator for the further polymerization of the additional monomer. Since the novel initiators provide a reactive group "Az" at a terminal end of the polymer, linking groups may be used to join two polymer blocks. For example, in one embodiment, a polymer prepared in accord with the present invention, and having an azlactone group of Formula V at one terminus, may be reacted with a second polymer block having a nucleophilic terminal group.

Statistical copolymers may be produced using the initiators of the present invention. Such copolymers may use 2 or more monomers in a range of about 0–100% by weight of each of the monomers used. The product copolymer will be a function of the molar amounts of the monomers used and the relative reactivity of the monomers.

The present invention also provides graft or "comb" copolymers. Here, a first (co)polymer having pendent nucleophilic functional groups, such hydroxy-, amino- or thio-groups, etc. is provided. An example of a useful (co) polymers include hydroxyethyl acrylate (co)polymers. Next, the reactive functional groups of the first (co)polymer is reacted with the azlactone initiators of Formula I to provide a (co)polymer having pendent, ring-opened initiator moieties, the reaction product having the structure of Formula II, where $R^5$ is the residue of the first (co)polymer. This product (co)polymer may then be used as an initiator to polymerize the previously-described monomers to produce a comb (co)polymer. Alternatively, the first (co)polymer may be reacted with a telechelic (co)polymer of the invention, whereby the reactive "Az" terminal group reacts with the pendent reactive group of the first (co)polymer.

Gradient or tapered copolymers can be produced using NMP by controlling the proportion of two or more monomers being added. For example, one can prepare a first block or an oligomer of a first monomer, then a mixture of the first monomer and a second distinct monomer can be added in proportions of from, for example, 1:1 to 9:1 of first monomer to second monomer. After conversion of all monomer(s) is complete, sequential additions of first monomer-second monomers mixtures can provide subsequent "blocks" in which the proportions of first monomer to second monomer vary. Thus, the invention provides copolymers obtained from two or more radically (co)polymerizable monomers wherein the copolymer has a composition that varies along the length of the polymer chain from azlactone terminus to opposite terminus based on the relative reactivity ratios of the monomers and instantaneous concentrations of the monomers during polymerization

EXAMPLES

All reagents unless otherwise noted were purchased from Aldrich (Milwaukee, Wis.) and were used in their delivered condition. Polymerizable reagents were stripped of inhibitors prior to use by passing them through an alumina column (also supplied by Aldrich). Solvents were purchased from EM Science located in Gibbstown, N.J.

Glossary

| VDM | 2-vinyl-4,4-dimethyl azlactone |
| --- | --- |
| TEMPO | 2,2,6,6-tetramethylpiperidinyloxy |
| monoTEMPO | 2,2,6,6-Tetramethyl-1-(1-phenyl-ethoxy)-piperidine |
| AzTEMPO | 4,4-dimethyl-2-[1-(2,2,6,6-tetramethyl-piperidin-1-yloxy)-ethyl]-4H-oxazol-5-one |

Preparative Example 1

Preparation of 2-(2-Bromopropionylamino)-2-methylpropionic acid

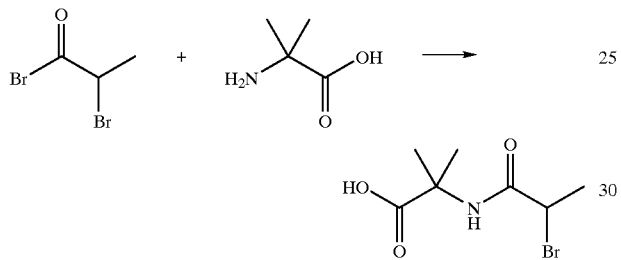

A stirring mixture of 2-aminoisobutyric acid (52.08 g; 0.51 mol), sodium hydroxide (20.20 g; 0.51 mol), water (200 ml) and chloroform (50 ml) was cooled to −12° C. 2-Bromopropionyl bromide (100 g, 0.46 mol) in chloroform (150 ml) was added to the mixture over 15 minutes. The reaction mixture was then allowed to warm to room temperature after which time the mixture was filtered to isolate the solid that had precipitated. The solid was combined with hot toluene (700 ml) and this mixture was then allowed to cool. The while solid was isolated by filtration and was dried under vacuum to afford 77.60 g (70% yield) of 2-(2-bromopropionylamino)-2-methylpropionic acid.

Preparative Example 2

Preparation of 2-(2-Diethylthiocarbamoylsulfanylpropionylamino)-2-methylpropionic acid

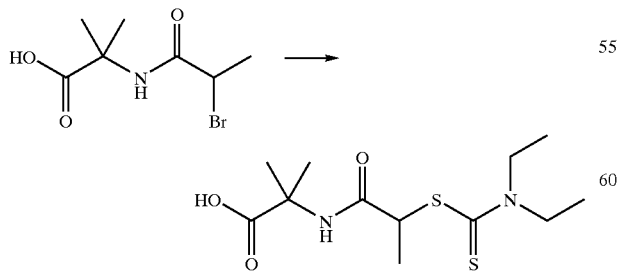

To a solution of 2-(2-bromopropionylamino)-2-methylpropionic acid (5.00 g; 0.021 mol) in acetone (100 ml) there was added sodium diethylthiocarbamate trihydrate (4.80 g; 0.021 mol). The mixture was stirred at room temperature for 17 hours after which it was filtered. The filtrate was concentrated under vacuum and the residue was dissolved in acetone (10 ml). This solution was then filtered and the filtrate was concentrated under vacuum to afford 5.00 g (78% yield) of 2-(2-diethylthiocarbamoyl-sulfanylpropionylamino)-2-methylpropionic acid as a yellow solid.

Preparative Example 3

Preparation of 2-Methyl-2-[2-(2,2,6,6-tetramethylpiperidin-1-yloxy)-propionylamino]-propionic acid

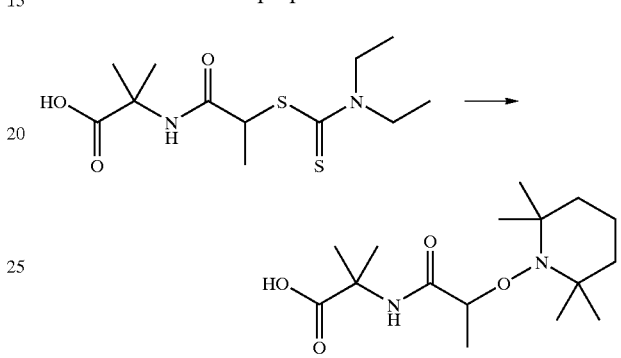

A mixture of 2-(2-diethylthiocarbamoyl-sulfanylpropionylamino)-2-methylpropionic acid (4.00 g; 0.0132 mol), TEMPO (2.04 g; 0.01 32 mol) and ethyl acetate (35 ml) in a glass jar was purged with nitrogen gas for 20 minutes. The jar was then sealed and the mixture was irradiated with a 350 mn ultraviolet lamp (Sylvania 350 Blacklight F15T8/350BL available from Osram Sylvania, Danvers, Mass.) for 65 hours. The mixture was then concentrated under vacuum and diluted with diethyl ether (50 ml). The solid was isolated by filtration and was dried under vacuum to afford 1.75 g (42% yield) of 2-methyl-2-[2-(2,2,6,6-tetramethylpiperidin-1-yloxy)-propionylamino]-propionic acid.

Example 1

Preparation of 4,4-Dimethyl-2-[1-(2,2,6,6-tetramethylpiperidin-1-yloxy)-ethyl]-4H-oxazol-5-one (AzTEMPO)

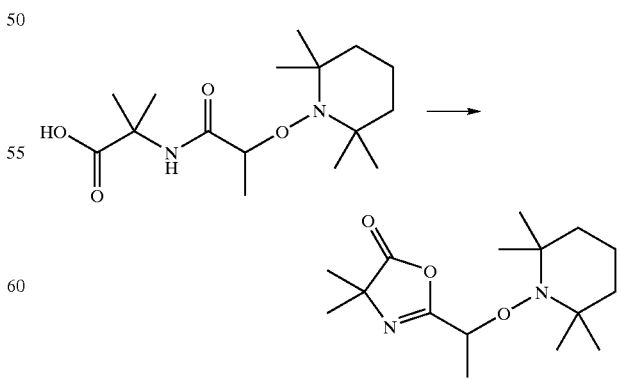

To a stirred mixture of 2-methyl-2-[2-(2,2,6,6-tetramethylpiperidin-1-yloxy)-propionylamino]-propionic acid (0.50 g; 0.0016 mol), triethylamine (0.16 g; 0.0016 mol) and acetone (5 ml) there was added ethyl chloroformate (0.17 g; 0.0016 mol). After 2 hours, the mixture was filtered and the filtrate was concentrated under vacuum. The residue was mixed with hexane (5 ml) and the solution was decanted from the precipitated solid. The decanted solution was concentrated under vacuum to give 0.30 g (64% yield) of 4,4-dimethyl-2-[1-(2,2,6,6-tetramethylpiperidin-1-yloxy)-ethyl]-4H-oxazol-5-one (AzTEMPO) as a yellow oil.

Example 2

Preparation of an Azlactone Functional Oligomeric Initiator

VDM (1.1 g, 0.0079 mol) and monoTEMPO (0.2 g, 0.0077 mol) were dissolved in toluene (1.3 g) in a three-necked round bottom flask equipped with magnetic stirring, $N_2$ inlets and outlets, a condenser and a thermocouple. The mixture was stirred and flushed with nitrogen gas for a period of 30 minutes after which it was heated to 110° C. with an oil bath for a period of 4 hours.

Example 3

To the reaction mixture of Example 2 there was added a solution of styrene (10 g, 0.096 mol) in toluene (10 g) that had been deoxygenated by bubbling nitrogen gas through it for 30 minutes. This mixture was stirred at 130° C. for 16 hours after which time is was analyzed by gel permeation chromatography. The reaction yielded a polymer with a $M_n$ of 11,200 and a polydispersity of 1.24. The theoretical $M_n$ was 14,400. To qualitatively demonstrate the presence of the azlactone groups on the resulting polymer, a tri-functional amine (tris(2-aminoethyl)amine) was added to the polymer. This reaction produced an insoluble cross-linked polymer, thus demonstrating that the polystyrene was connected to the oligomeric azlactone initiator and that the azlactone groups on the chain-ends were reactive towards mild nucleophiles.

Examples 4–5

Controlled Polymerization of Styrene Using AzTEMPO

Screw-cap glass vials were charged with styrene and AzTEMPO in amounts as given in the table. Toluene was added in the calculated amount to give solutions that were 25 wt % solids. The solutions were deoxygenated by bubbling nitrogen gas through them for 30 minutes. The vials were then capped and were heated to 130° C. in an oil bath for 16 hours, after which time the vials were opened and the products were analyzed by gel permeation chromatography. The results are shown in the table below.

|  | Example 4 | Example 5 |
| --- | --- | --- |
| Styrene | 0.997 g (0.0096 mol) | 1.019 g (0.0098 mol) |
| AzTEMPO | 0.026 g (0.000088 mol) | 0.0047 g (0.000018 mol) |
| Calculated Mn (100% conversion) | 11350 g/mol | 64250 g/mol |
| Actual Mn | 2790 g/mol | 23900 g/mol |
| PDI | 1.76 | 2.05 |
| Monomer converted | 43% | 62% |

Example 6

Preparation of N-{2-[Bis-(2-{2-methyl-2-[2-(2,2,6,6-tetramethylpiperidin-1-yloxy)-propionylamino]-propionylamino}-ethyl)amino]-ethyl}-2-methyl-2-[2-(2,2,6,6-tetramethylpiperidin-1-yloxy)-propionylamino]propionamide.

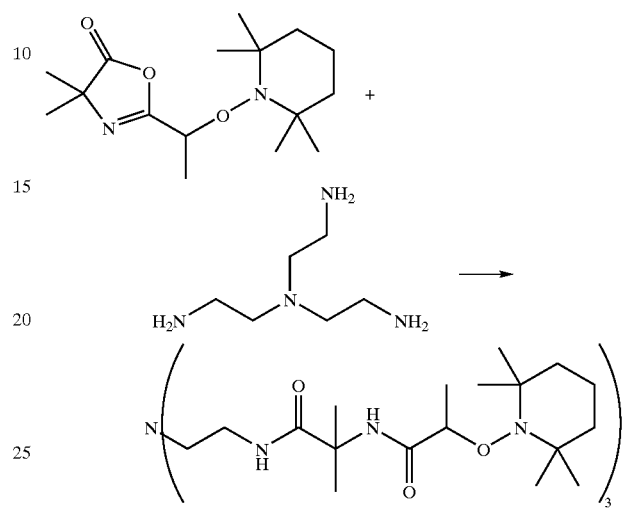

A solution of tris(2-aminoethyl)amine (0.032 g; 0.00022 mol) in tetrahydrofuran (2.0 ml) was combined with AzTEMPO (0.20 g; 0.00067 mol) and the solution was stirred at room temperature for 30 minutes. The solution was concentrated under vacuum to give a residue that was triturated with hexane and filtered. The resultant white powder was dried under vacuum to give 0.12 g (51% yield) of product.

Example 7

Polymerization of Styrene Using N-{2-[bis-(2-{2-methyl-2-[2-(2,2,6,6-tetramethylpiperidin-1-yloxy)-propionylamino]-propionylamino}-ethyl)-amino]-ethyl}-2-methyl-2-[2-(2,2,6,6-tetramethylpiperidin-1-yloxy)-propionylamino]propionamide.

A three-arm star polymer of styrene was prepared using the initiator of Example 6. A 30 weight percent solution of the initiator in toluene (0.0253 g; 0.000024 mol of initiator) was mixed with styrene. The solution was deoxygenated by bubbling nitrogen gas through it for 30 minutes and was then heated to 130° C. After 24 hours the solution was allowed to cool to room temperature and the polymer was precipitated from the solution by the addition of methanol. The polymer was analyzed by gel permeation chromatography and was found to have Mn of 16,256 g/mol and a PDI of 1.18. It was determined gravimetrically that 40% of the monomer was converted in the reaction.

Example 8

A three-arm star polymer of styrene was prepared by reaction of a linear styrene polymer with a trifunctional amine. AzTEMPO (0.196 g; 0.00066 mol) and styrene (13.696 g; 0.132 mol) were mixed in toluene (13.9 g). The solution was deoxygenated by bubbling nitrogen gas through it for 30 minutes and was then heated to 130° C. After 16 hours the solution was allowed to cool to room temperature and the resultant polymer was analyzed by gel permeation chromatography. The number average molecular weight was found to be 20,611 g/mol. As the solution was stirred, a 1 wt % solution of tris(2-aminoethyl)amine (0.033 g, 0.000226 mol) in toluene was added in two portions. The product was analyzed by gel permeation chromatography after the addition of each portion of the amine. After the addition of the first portion, the three-arm polymer that formed was found to have Mn of 50,061 g/mol and the relative amount of this polymer product increased after the addition of the second portion of amine.

We claim:

1. A telechelic (co)polymer comprising polymerized units of one or more free radically (co)polymerizable monomers,
an first ring-opened azlactone terminal group; and
a second terminal group that is the residue of an organonitroxide
wherein the (co)polymer comprises the structure
Az—$(M^1)_x$—$ON(R^2)_2$, wherein $ON(R^2)_2$ is the residue of an organonitroxide; $M^1$ is a monomer unit derived from a radically (co)polymerizable monomer unit having an average degree of polymerization x, and Az is a ring-opened azlactone group of the formula:

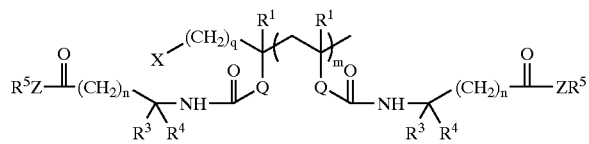

wherein X is an H, an alkyl group, a cycloalkyl group, a heterocyclic group, an arenyl group, an aryl group, a nitrile, an acyl group or the residue of a free-radical initiator; $R^1$ is H, an alkyl group, a cycloalkyl group, a heterocyclic group, an arenyl group or an aryl group; $R^3$ and $R^4$ are each independently selected from an alkyl, a cycloalkyl group, an aryl group, an arenyl group, or $R^3$ and $R^4$ taken together with the carbon to which they are attached from a carbocyclic ring; Q is a linking group selected from a covalent bond, $(-CH_2-)_o$, $-CO-O-(CH_2)_o-$, $-CO-O-(CH_2CH_2O)_o-$, $-CO-NR^6-(CH_2)_o-$, $-CO-S-(CH_2)_o-$, where o is 1 to 12, and $R^6$ is H, an alkyl group, a cycloalkyl group, an arenyl group, a heterocyclic group or an aryl group; each n is 0 or 1; m is 0 to 20; q is 0 or 1; Z is O, S or $NR^6$, wherein $R^6$ is H, an alkyl group, a cycloalkyl group, an arenyl group, a heterocyclic group or an aryl group; $R^5$ is an organic or inorganic moiety and has a valency of p.

2. The (co)polymer of claim 1 having a molecular weight distribution of less than 2.0.

3. The copolymer of claim 1 comprising two or more blocks of units obtained from free radically (co)polymerizable monomers, wherein the block copolymer has an azlactone residue at a first terminal end and, and the residue of an organonitroxide at the second terminal end.

4. The (co)polymer of claim 1 comprising polymerized units obtained from two or more radically (co)polymerizable monomers wherein the copolymer has a composition that varies along the length of the polymer chain from azlactone terminus to opposite terminus based on the relative reactivity ratios of the monomers and instantaneous concentrations of the monomers during polymerization.

5. The (co)polymer of claim 1, wherein said (co)polymer comprises polymerized monomer units selected from the group consisting of (meth)acrylic acid and esters thereof; fumaric acid and esters thereof; itaconic acid and esters thereof; maleic anhydride; styrene; α-methyl styrene; vinyl halides; (meth)acrylonitrile, vinylidene halides; butadienes; unsaturated alkylsulphonic acids and esters and halides thereof; and (meth)acrylamides, and mixtures thereof; said (co)polymer having an azlactone residue at a first terminal end of the (co)polymer chain and a residue of an organonitroxide at a second terminal end of the (co)polymer chain.

6. The (co)polymer of claim 1 having the structure
AZ—$(M^1)_x(M^2)_x$—$(M^3)_x$ ... $(M^\Omega)_x$—$ON(R^2)_2$, wherein $ON(R^2)_2$ is the residue of an organonitroxide;
$M^1$ to $M^\Omega$ are each polymer blocks of monomer units derived from a radically (co)polymerizable monomer units having an average degree of polymerization x,
each x is independent, and
Az is a ring-opened azlactone group of the formula:

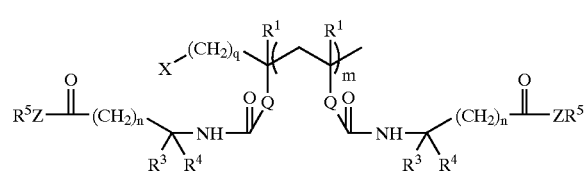

wherein X is an H, an alkyl group, a cycloalkyl group, a heterocyclic group, an arenyl group, an aryl group, a nitrile, an acyl group or the residue of a free-radical initiator,
$R^1$ is H, an alkyl group, a cycloalkyl group, a heterocyclic group, an arenyl group or an aryl group;
$R^3$ and $R^4$ are each independently selected from an alkyl, a cycloalkyl group, an aryl group, an arenyl group, or $R^3$ and $R^4$ taken together with the carbon to which they are attached form a carbocyclic ring;
Q is a linking group selected from a covalent bond, $(-CH_2-)_o$, $-CO-O-(CH_2)_o-$, $-CO-O-CH_2CH_2O)_o-$, $-CO-NR^6-(CH_2)_o-$, $-CO-S-(CH_2)_o-$, where o is 1 to 12, and $R^6$ is H, an alkyl group, a cycloalkyl group, an arenyl group, a heterocyclic group or an aryl group;
each n is 0 or 1;
m is 0 to 20;
q is 0 or 1;
Z is O, S or $NR^6$, wherein $R^6$ is H, an alkyl group, a cycloalkyl group, an arenyl group, a heterocyclic group or an aryl group;
$R^5$ is an organic or inorganic moiety and has a valency of p.

7. The (co)polymer of claim 1 wherein the residue of the hindered organonitroxide, —$ON(R^2)_2$, is of the formula

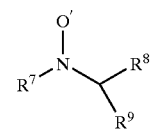

wherein
$R^7$ is an alkyl group, a cycloalkyl group, an arenyl group, a heterocyclic group, an aryl group;
$R^8$, and $R^9$ are independently H, or an alkyl group, a cycloalkyl group, an arenyl group, a heterocyclic group, an aryl group, and $R^7$ and $R^8$, or $R^8$ and $R^9$, may be taken together to form a carbocyclic ring.

8. The (co)polymer of claim 1 wherein said $R^5Z$ group is derived from a compound of the formula $R^5(ZH)_p$ wherein $R^5$ is an inorganic or organic group of valence p, and —ZH is selected from OH, SH or $NHR^6$, wherein $R^6$ is H, an alkyl group, a cycloalkyl group, an arenyl group, a heterocyclic group or an aryl group.

9. The (co)polymer of claim 1, wherein said $R^5$ group comprises metal- or nonmetal oxides having a plurality of —ZH groups on the surface.

10. The (co)polymer of claim 1, wherein said $R^5$ group comprises a non-polymeric aliphatic, cycloaliphatic, aromatic or alkyl-substituted aromatic moiety having from 1 to 30 carbon atoms.

11. The (co)polymer of claim 1, wherein said $R^5$ group comprises a polyoxyalkylene, polyester, polyolefin, polyacrylate, or polysiloxane polymer having pendent or terminal reactive —ZH groups.

12. A method for preparing the of claim 1 comprising addition polymerizing one or more olefinically unsaturated monomers using an initiator of the formula:

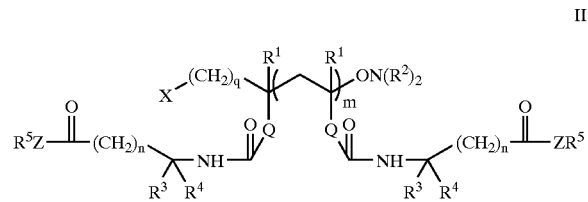

II wherein

X is an H, an alkyl group, a cycloalkyl group, a heterocyclic group, an arenyl group, an aryl group, a nitrile, an acyl group or the residue of a free-radical initiator;

$R^1$ is H, an alkyl group, a cycloalkyl group, a heterocyclic group, an arenyl group or an aryl group;

$ON(R^2)_2$ is the residue of an organonitroxide;

$R^3$ and $R^4$ are each independently selected from an alkyl, a cycloalkyl group, an aryl group, an arenyl group, or $R^3$ and $R^4$ taken together with the carbon to which they are attached form a carbocyclic ring;

Q is a linking group selected from a covalent bond, $(-CH_2-)_o$, $-CO-O-(CH_2)_o-$, $-CO-O-(CH_2CH_2O)_o-$, $-CO-NR^6-(CH_2)_o-$, $-CO-S-(CH_2)_o-$, where o is 1 to 12, and $R^6$ is H an alkyl group, a cycloalkyl group, an arenyl group, a heterocyclic group or an aryl group;

each n is 0 or 1;

m is 0 to 20;

q is 0 or 1;

Z is O, S or $NR^6$, wherein $R^6$ is H, an alkyl group, a cycloalkyl group, an arenyl group, a heterocyclic group or an aryl group;

$R^5$ is an organic or inorganic moiety and has a valency of p.

13. The method of claim 12, wherein m is 0, q is 0, and X is an H, an alkyl group, a cycloalkyl group, a heterocyclic group, an arenyl group, an aryl group, a nitrile, or an acyl group.

14. The method of claim 12, wherein m is 1 to 20, X is the residue of a free-radical initiator, and q is 1.

15. The method of claim 12, wherein $R^1$ is a $C_1$ to $C_4$ alkyl group.

16. The method of claim 12 wherein $R_1$ is H.

17. The method of claim 12 wherein at least one of $R_3$ and $R_4$ is a $C_1$ to $C_4$ alkyl group.

18. The method of claim 12 wherein $R_3$ and $R_4$ are methyl.

19. The method according to claim 12, wherein the addition polymerization is conducted at a temperature between 100 to 160° C.

20. The method according to claim 12, wherein the olefinically unsaturated monomers are selected from (meth) acrylic acid and esters thereof, fumaric acid and esters thereof, itaconic acid and esters thereof, maleic anhydride; styrene, α-methyl styrene; vinyl halides; (meth) acrylonitrile, vinylidene halides; vinyl pyridine; unsaturated alkylsulphonic acids and esters and halides thereof; and (meth)acrylamides, and mixtures thereof.

21. The method according to claim 12, wherein the polymerization is conducted in bulk or in a solvent.

22. The method of claim 21 wherein said solvent is selected from ethers, cyclic ethers, alkanes, cycloalkanes, aromatic hydrocarbon solvents, halogenated hydrocarbon solvents, acetonitrile, mixtures of such solvents, and supercritical solvents.

23. The method according to claim 12 further comprising a second polymerizing step using one or more additional olefinically unsaturated monomers.

24. The method of claim 12, wherein the initiator is present in a concentration of from $10^{-4}$ M to 1 M.

25. The method of claim 12, wherein the molar ratio of initiator and monomer(s) is from $10^{-4}$:1 to $10^{-1}$:1 of initiator to monomer(s).

* * * * *

UNITED STATES PATENT AND TRADEMARK OFFICE
CERTIFICATE OF CORRECTION

PATENT NO. : 6,784,265 B2
APPLICATION NO. : 10/726956
DATED : August 31, 2004
INVENTOR(S) : Duane D. Fansler It is certified that error appears in the above-identified patent and that said Letters Patent is hereby corrected as shown below:

Column 3
Line 66, delete "aziactonyl" and insert -- azlactonyl --, therefor.

Column 9
Line 67, delete "popanediol" and insert -- propanediol --, therefor.

Column 11
Line 3, delete "preexisting" and insert -- pre-existing --, therefor.

Column 15
Line 38, after "100g" delete "," and insert --; --, therefor.

Column 18
Line 5, delete "ethyl)amino" and insert -- ethyl)-amino --, therefor.

Column 19
Lines 3-4, after "0.033g" delete "," and insert -- ; --, therefor.
Line 16, in Claim 1, after "nitroxide" insert -- ; --.
Lines 17-18, in Claim 1, delete "wherein the (co)polymer comprises the structure" before "Az".
Line 39, in Claim 1, delete "from" and insert -- form --, therefor.

Column 20
Line 29, in Claim 6, after "initiator" delete "," and insert -- ; --, therefor.

UNITED STATES PATENT AND TRADEMARK OFFICE
CERTIFICATE OF CORRECTION

PATENT NO. : 6,784,265 B2  Page 2 of 2
APPLICATION NO. : 10/726956
DATED : August 31, 2004
INVENTOR(S) : Duane D. Fansler It is certified that error appears in the above-identified patent and that said Letters Patent is hereby corrected as shown below:

<u>Column 21</u>
Line 18, in Claim 12, after "the" insert -- (co)polymer --.
Line 45, in Claim 12, after "H" insert -- , --.

Signed and Sealed this

Third Day of April, 2007

JON W. DUDAS
*Director of the United States Patent and Trademark Office*